United States Patent [19]

Herron et al.

[11] Patent Number: 5,419,215

[45] Date of Patent: * May 30, 1995

[54] AUTOMATIC STEERING WHEEL PIVOTING MECHANISM

[75] Inventors: Ross Herron, Birmingham; Garry E. Beard, Livonia, both of Mich.

[73] Assignee: Ultra-Precision Manufacturing Ltd., Birmingham, Mich.

[*] Notice: The portion of the term of this patent subsequent to Apr. 30, 2008 has been disclaimed.

[21] Appl. No.: 829,723

[22] Filed: Jan. 31, 1992

Related U.S. Application Data

[63] Continuation-in-part of Ser. No. 658,133, Feb. 20, 1991, Pat. No. 5,163,337, which is a continuation of Ser. No. 402,782, Sep. 5, 1989, Pat. No. 5,010,779.

[51] Int. Cl.⁶ .................................................. B62D 1/18
[52] U.S. Cl. .................................. 74/493; 280/775; 318/466; 318/475
[58] Field of Search .................... 74/493; 280/775; 318/466, 475; 192/138; 49/26, 28

[56] References Cited

U.S. PATENT DOCUMENTS

| | | | |
|---|---|---|---|
| 3,078,407 | 2/1963 | Schaefer | 49/28 X |
| 3,216,512 | 11/1965 | Ulrich | 180/78 |
| 3,287,618 | 11/1966 | Stephens | 49/28 X |
| 3,299,733 | 1/1967 | Felts et al. | 74/493 |
| 3,742,646 | 7/1973 | Piech | 49/28 |
| 4,503,504 | 3/1985 | Suzumura et al. | 364/425 |
| 4,661,752 | 4/1987 | Nishikawa et al. | 318/434 |
| 4,686,598 | 8/1987 | Herr | 49/28 X |
| 4,691,587 | 9/1987 | Farrand et al. | 74/493 |
| 4,775,939 | 10/1988 | Nakashima et al. | 364/424.05 |
| 4,900,059 | 2/1990 | Kinoshita et al. | 280/775 |
| 4,934,737 | 6/1990 | Nakatsuka | 280/775 |
| 4,978,137 | 12/1990 | Futami et al. | 280/775 |
| 5,010,779 | 4/1991 | Herron et al. | 74/493 |
| 5,163,337 | 11/1992 | Herron et al. | 74/493 |

FOREIGN PATENT DOCUMENTS

| | | | |
|---|---|---|---|
| 3618266 | 10/1987 | Germany . | |
| 60-12375 | 1/1985 | Japan . | |
| 60-157963 | 8/1985 | Japan . | |
| 61-67659 | 4/1986 | Japan | 74/493 |
| 62-39364 | 2/1987 | Japan | 74/493 |
| 62-39365 | 2/1987 | Japan . | |
| 3-25074 | 2/1991 | Japan | 74/493 |

Primary Examiner—Allan D. Herrmann
Attorney, Agent, or Firm—Howard & Howard

[57] ABSTRACT

An automatic steering wheel pivoting mechanism includes a unique mount structure such that two engaged mechanical elements which pivot the steering wheel are both mounted in a cantilever-like fashion at one lateral side. This decreases the lateral size required for the pivoting mechanism. The mechanical elements are mounted in boss members extending outwardly of a steering column and a wheel column such that they are securely connected to the respective columns. In a further feature of the present invention, a motor for the mechanical members monitors the resistance to further pivoting of the steering wheel, and shuts the motor off should that force exceed a predetermined maximum.

8 Claims, 7 Drawing Sheets

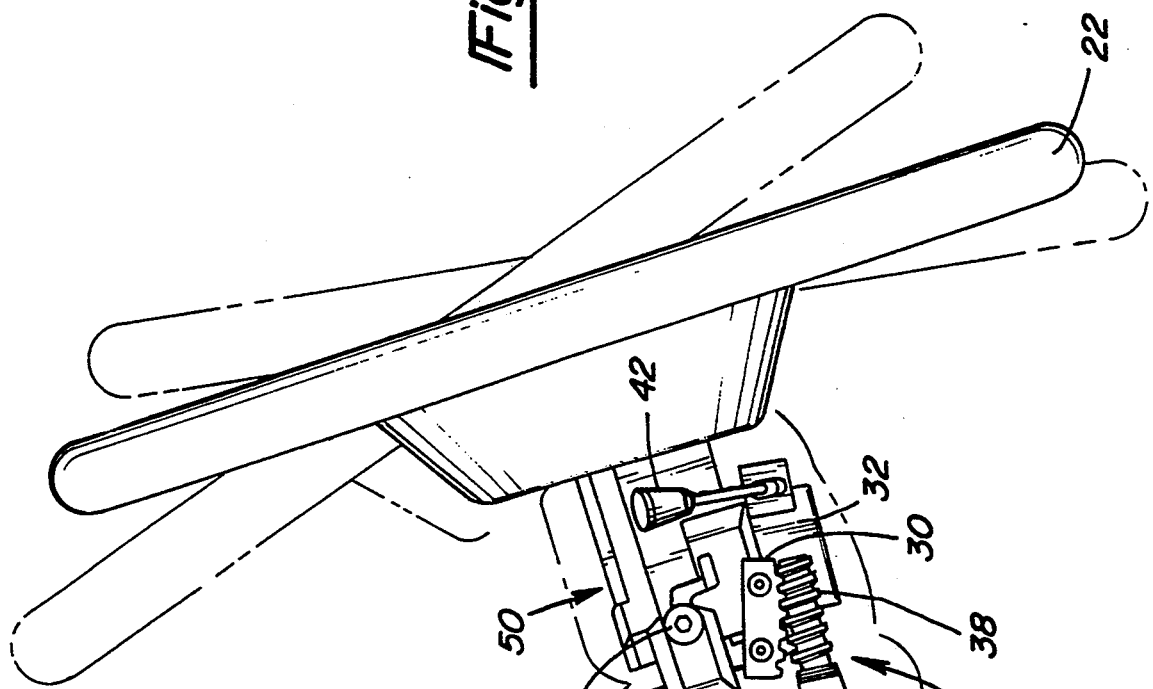
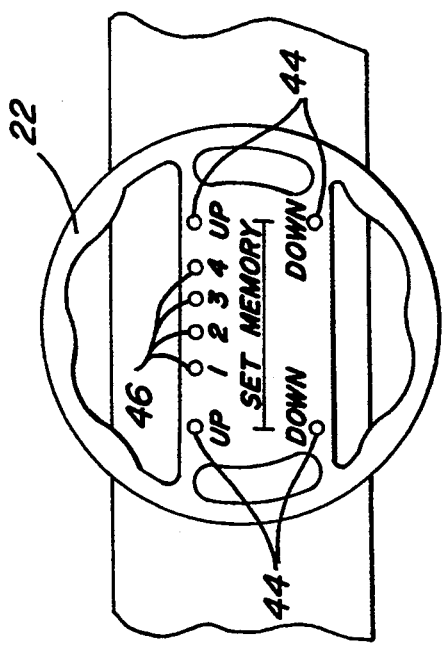
Fig-2
Fig-3

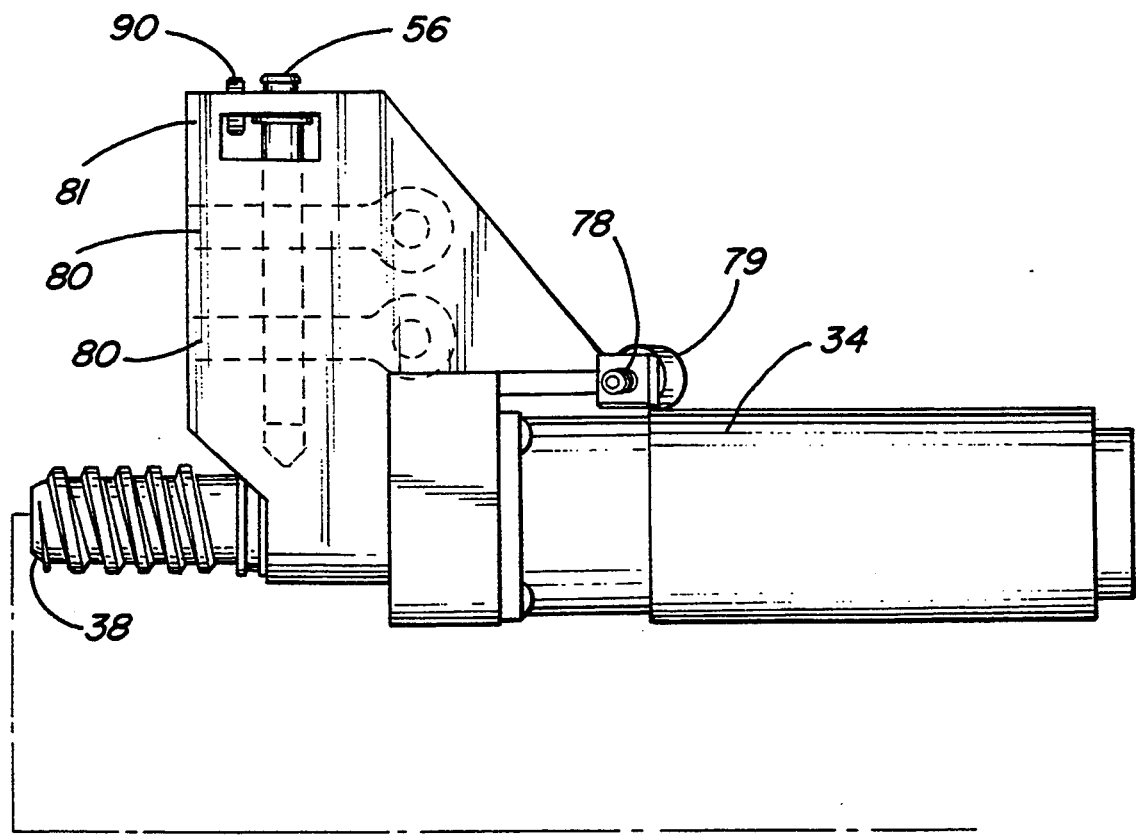
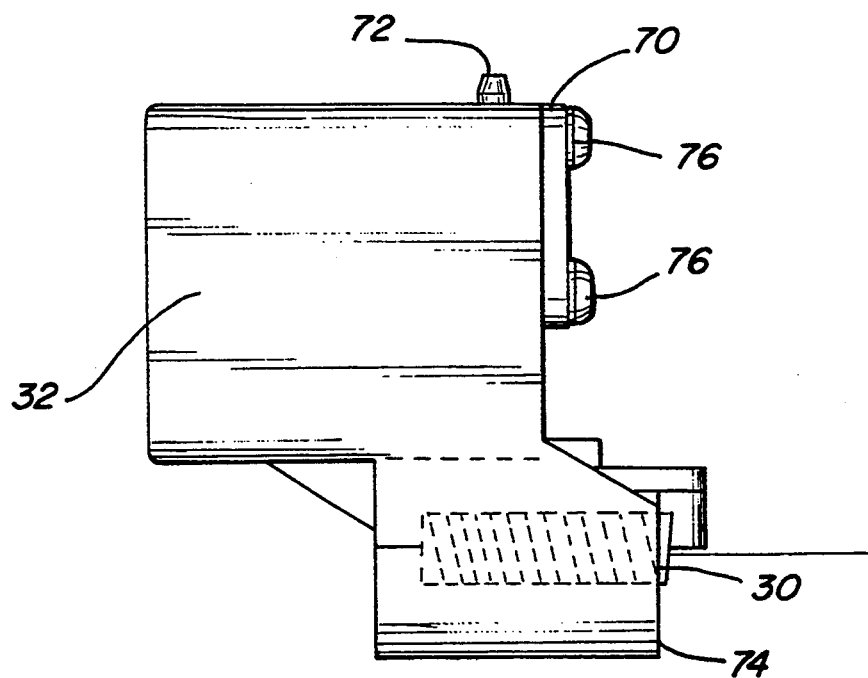
Fig-9

AUTOMATIC STEERING WHEEL PIVOTING MECHANISM

This application is a continuation-in-part of United States patent application Ser. No. 07/658,133, filed Feb. 20, 1991, now U.S. Pat. No. 5,163,337, which is a continuation of Ser. No. 07/402782, filed Sep. 5, 1989, now U.S. Pat. No. 5,010,779, and International Application No. PCT/US91/01967 which is a continuation-in-part of Ser. No. 07/402782.

BACKGROUND OF THE INVENTION

This invention relates to the unique mounting of an automatic steering wheel pivoting mechanism system, and to safety features associated with operation of the mechanism.

Tilt steering wheels are employed in many modern vehicles and allow an operator to manually select any one of a plurality of pivoted positions for the steering wheel with respect to the vehicle seat and fixed instrument panel. Traditionally, these systems have been manually adjusted.

The incorporation of powered steering pivoting mechanisms into modern vehicles has presented several difficulties. First, they are often relatively bulky. A major criteria in any modern vehicle design is the efficient use of space. It is desirable to utilize a minimum of space for any pivoting mechanism. Further, it is also necessary to ensure that any components associated with a vehicle steering system be securely mounted such that they can withstand a minimum impact. Finally, it is also desirable to ensure that the powered pivoting mechanism be safe for use by an operator.

SUMMARY OF THE INVENTION

A disclosed automatic steering wheel pivoting mechanism includes a control feature which monitors a resistance force to further pivotal movement of the wheel, and stops further movement should a predetermined maximum force be exceeded. As an example, should the wheel be pivoted downwardly such that it contacts the vehicle operator, the system will sense the resistance and stop further movement.

In a further feature of the present invention, the automatic steering wheel pivoting mechanism comprises a wheel column which is pivotally attached to a fixed steering column. A mechanical drive pivots the wheel column relative to the steering column, and includes a first member mounted at one lateral side to the steering column in a cantilever-like manner. A second member is mounted to the wheel column, also in a cantilever-like manner. Since the first and second members are mounted to one lateral side, the required lateral dimension for the overall mechanism is reduced. Further, bosses extend outwardly of the wheel and steering columns to mount the first and second members. These bosses provide a secure mount for the first and second members.

In a preferred embodiment of the present invention, the first and second members include a worm gear and a rack, respectively. The worm gear is preferably pivotally mounted to the steering column while the rack is preferably fixed to the wheel column. In further preferred features of the present invention, the bosses each include a pair of spaced channels which each receive channel inserts from mount portions of the worm gear and rack. This ensures a secure mount for the worm gear and rack.

These and other features of the present invention can be best understood from the following specification and drawings, of which the following is a brief description.

BRIEF DESCRIPTION OF THE DRAWINGS

FIG. 2 is a side view illustrating an inventive vehicle steering wheel pivoting mechanism.

FIG. 3 is a front view of a steering wheel showing control features.

FIG. 9 is a view of the inventive mechanism.

DETAILED DESCRIPTION OF A PREFERRED EMBODIMENT

Figure 1:
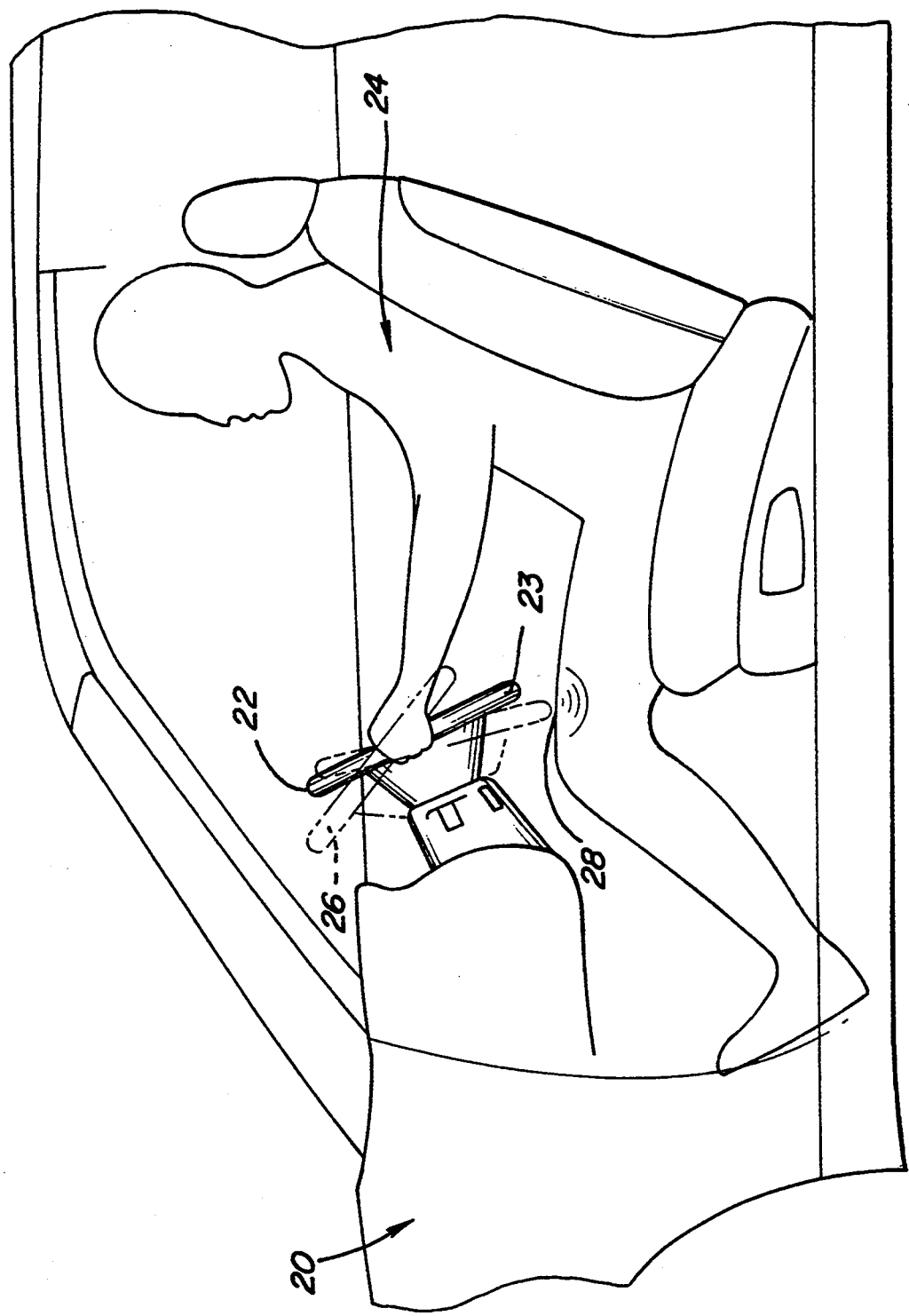
FIG. 1 is a largely schematic view of a vehicle interior.

The operation of an automatic steering wheel pivoting mechanism installed in a vehicle is shown in FIG. 1. Steering wheel 22 is shown in a normal operating position 23 for the individual operator 24. When operator 24 is prepared to exit the vehicle 20, the automatic pivoting mechanism is activated and the steering wheel 22 pivots to an uppermost pivoted position 26 relative to the vehicle operator 24. When the vehicle operator 24 re-enters the vehicle 20, the automatic pivoting mechanism is activated and the steering wheel 22 returns to a desired pivoted position 23 chosen by operator 24. The activation means for movement of steering wheel 22 may be the insertion or removal of an ignition key.

When wheel 22 is moving downwardly towards a desired position it may encounter a resistance force, such as could happen if it contacted operator 24, as shown at 28. The inventive system will not drive the wheel further should this resistance force exceed a predetermined maximum. The mechanical drive for steering wheel 22 is unable to overcome this resistance force and would "stall". A sensor on a motor for the inventive system monitors any stall. Should the stall exceed a predetermined time limit, the monitor would determine that an obstruction exists, and stop the motor for the system. Alternatively, wheel 22 may be returned to its uppermost position 26 prior to being stopped upon the sensing of a stall. The time limit may be on the order of 1.5 seconds.

As disclosed in the parents of the present application, an operator may enter a preferred pivotal position for the wheel into a memory. This memory may be identified by the particular operator through a code. This code could be a number entered into the vehicle's control system, or alternatively could be read from the operator's individual ignition key. As an alternative to a memory system, the steering wheel 22 may simply return to its last selected position upon actuation. An operator is provided with an override switch to allow changing of this position. When the vehicle is deactivated the wheel 22 returns to position 26. A limited memory is able to recall the last selected pivoted position, and returns wheel 22 to this pivoted position upon activation of the vehicle. The present invention incorporates the mechanical features and details as described in the parent applications, the disclosures of which are herein incorporated by reference.

As shown in FIG. 2, automatic pivoting mechanism 29 may include a rack 30, a rack mount 32, a drive 34, and a drive mount 36. Drive 34 rotates a worm gear 38 which engages rack 30. When worm gear 38 rotates, it drives rack 30 and wheel column 50 pivots about an axis along column pin 40. A sensor S may be mounted on motor 34 to monitor stall, as explained above.

A control lever 42 for activating the automatic pivoting mechanism to move steering wheel 22 up or down may be mounted on wheel column 50. Also as explained above, key K may automatically move the wheel to a pre-set position. An alternative control placement would mount control switches 44 on steering wheel 22, as shown in FIG. 3. Control switches 44 are mounted so that an operator may adjust the pivoted position of the steering wheel 22 with either hand while operating the vehicle. A vehicle operator's preferred pivoted position can be stored in memory by using the memory set buttons 46.

Figure 4:
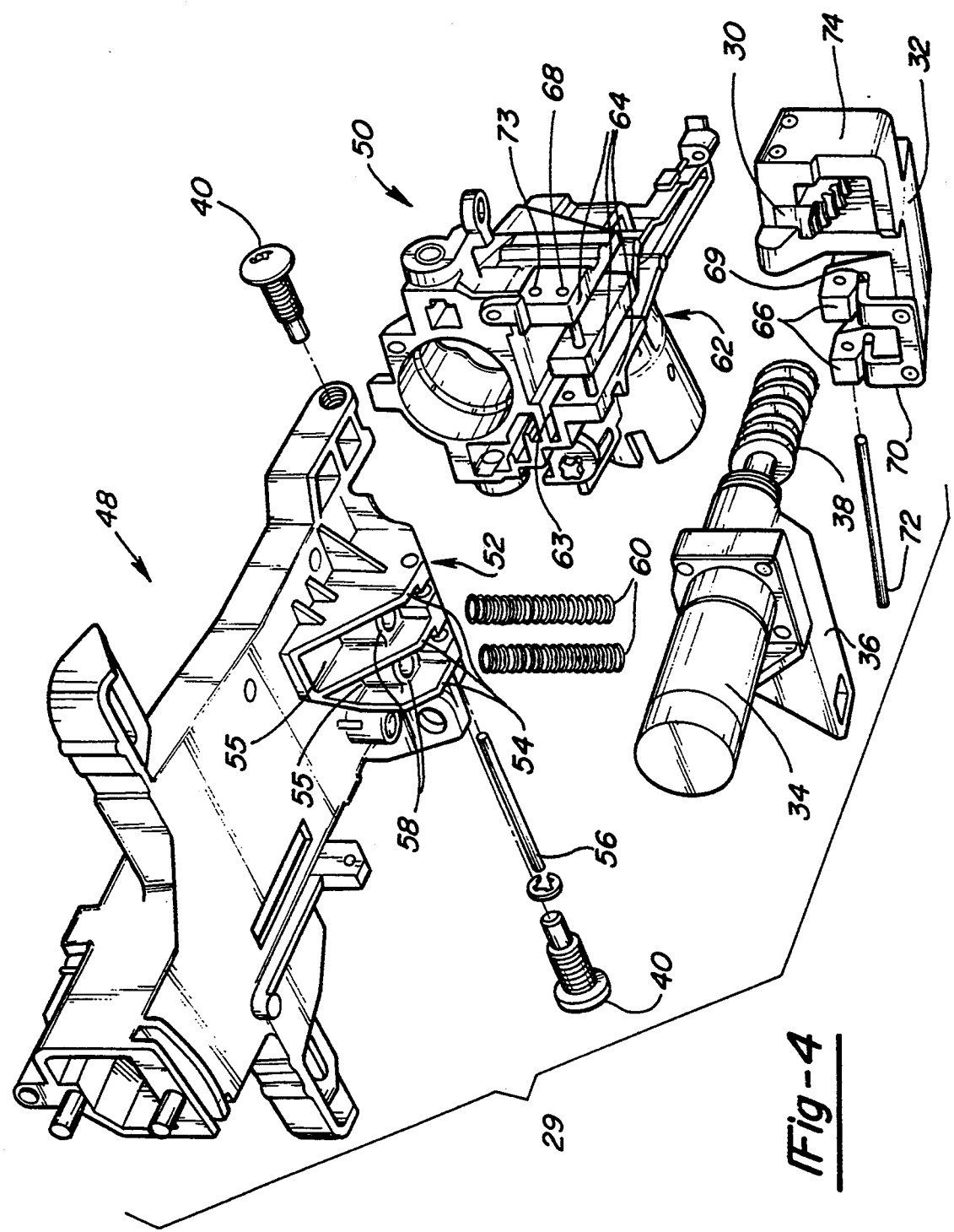
FIG. 4 is an exploded view showing an inventive vehicle steering wheel pivoting mechanism.

An exploded view of the component parts is shown in FIG. 4. Drive 34 and rack 30 are mounted to one lateral side of the underside of the steering column 48 and wheel column 50, respectively. Drive mount 36 and the rack mount 32 are positioned towards the center of steering column 48 and wheel column 50, respectively relative to drive 34 and rack 30. The two column pins 40 provide the pivotal connection.

A boss or worm drive mount surface 52 on steering column 48 is formed by three walls 54, which create two channels 55. The corresponding drive mount 36 comprises channel inserts and a side wall, discussed below. The channel inserts are inserted into channels 55. Apertures in channel walls 54, the side wall, and the channel inserts are aligned such that a drive pin 56 may be inserted to pivotally secure drive mount 36 in place. Within channels 55 are seats 58 for springs 60 which bias worm gear 38 towards rack 30, as will be explained below.

The rack mount 32 is rigidly fixed to a boss or rack mount surface 62. The rack mount surface 62 comprises three walls 64 forming two channels 63. Channel inserts 66 of rack mount 32 are inserted into channels 63. Apertures 73 in outer channel walls 64 and channel inserts 66 are aligned such that sliding pin 72 locks rack mount 32 in place. When installed, the sliding pin 72 and the plate 70, as explained below, combine to prevent any rotation of the rack. A casing 74 is fixed to rack mount 32, and surrounds worm gear 38 when assembled preventing disengagement.

Rack mount 32 includes a slot 69 which is initially positioned over a rack pin 68, which may be formed integrally with walls 64. Plate 70 is then mounted outwardly of rack pin 68 to close slot 69. Sliding pin 72 is then inserted through the apertures to fix rack mount 32 relative to wheel column 50.

The structure of the steering column 48 and wheel column 50 as shown is known in the prior art. The structure which defines the channels previously mounted a manually actuated pawl which was used for manually pivoting the wheel column relative to the steering column. With the inventive system, the rack 30 and worm gear 38 are mounted in a small lateral position and are firmly mounted due to the dual channel mount. Further, the inventive structure allows an assembler to either use a manual assembly, or an automatic pivoting assembly.

Figure 5:
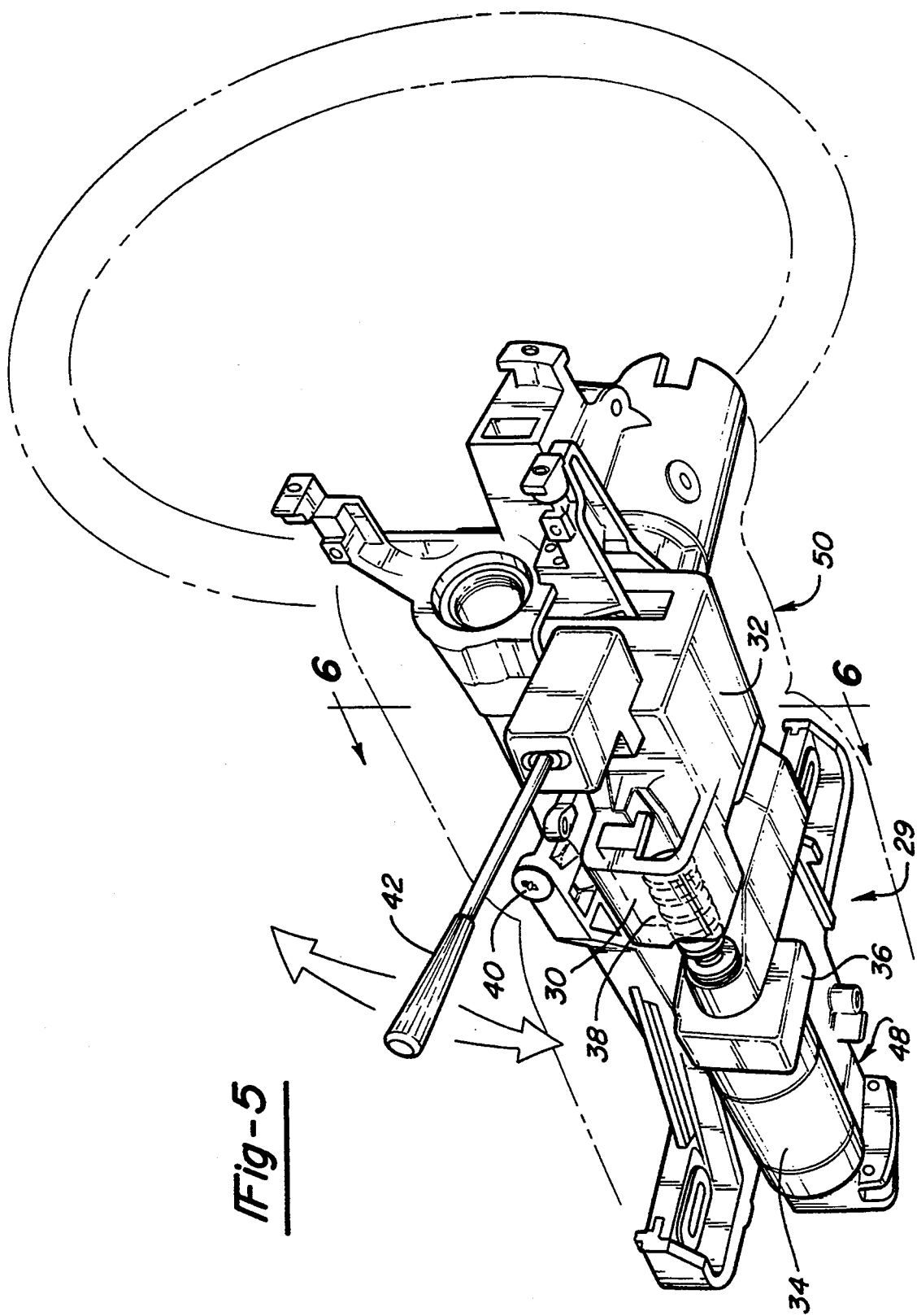
FIG. 5 is a perspective view showing an assembled vehicle steering wheel pivoting mechanism.

The assembled automatic tilt mechanism 29 is illustrated in FIG. 5. The installed component parts are received at one lateral side of steering column 48 and wheel column 50, and require limited space. Casing 74 closely encircles worm gear 38 to prevent disengagement during application of an unexpected force, but avoiding contact during normal operation. The casing 74 is a separate part which is attached to rack mount 32 after worm gear 38 is engaged with rack 30. As an alternative, an integral ledge could extend from rack mount 32, partially enclosing worm gear 38.

Figure 6:
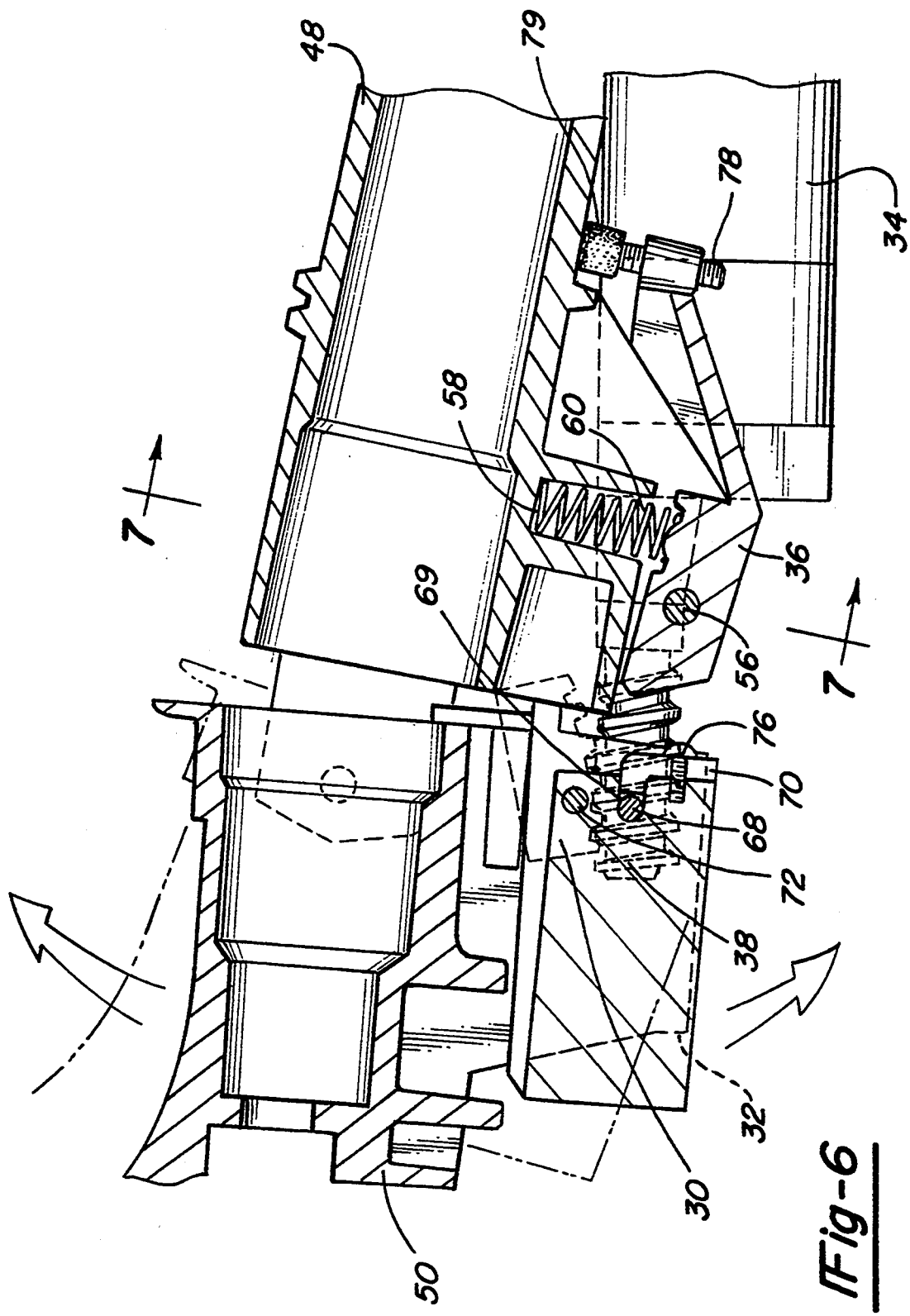
FIG. 6 is a cross-sectional view along line 6—6 as shown in FIG. 5.

FIG. 6 is a side view of rack mount 32 locked in place by fixed rack pin 68 and sliding rack pin 72. Rack plate 70 is secured by screws 76 to enclose slot 69 on fixed rack pin 68. Drive mount 36 pivots about pin 56 and rotates the worm gear 38 towards rack 30. Springs 60 mounted between surfaces 58 on steering column 48 and the drive mount 36 bias worm gear 38 towards rack 30. An adjusting stop 78 is installed to prevent drive 34 from pivoting to an overly great extent and contacting steering column 48 and also helps to keep worm gear 38 engaged with rack 30. The adjusting stop 78 comprises a screw secured to the drive mount fixture and pivotally attached to a cap 79. The cap 79 adjusts to provide a flat contact surface to steering column 48.

Figure 7:
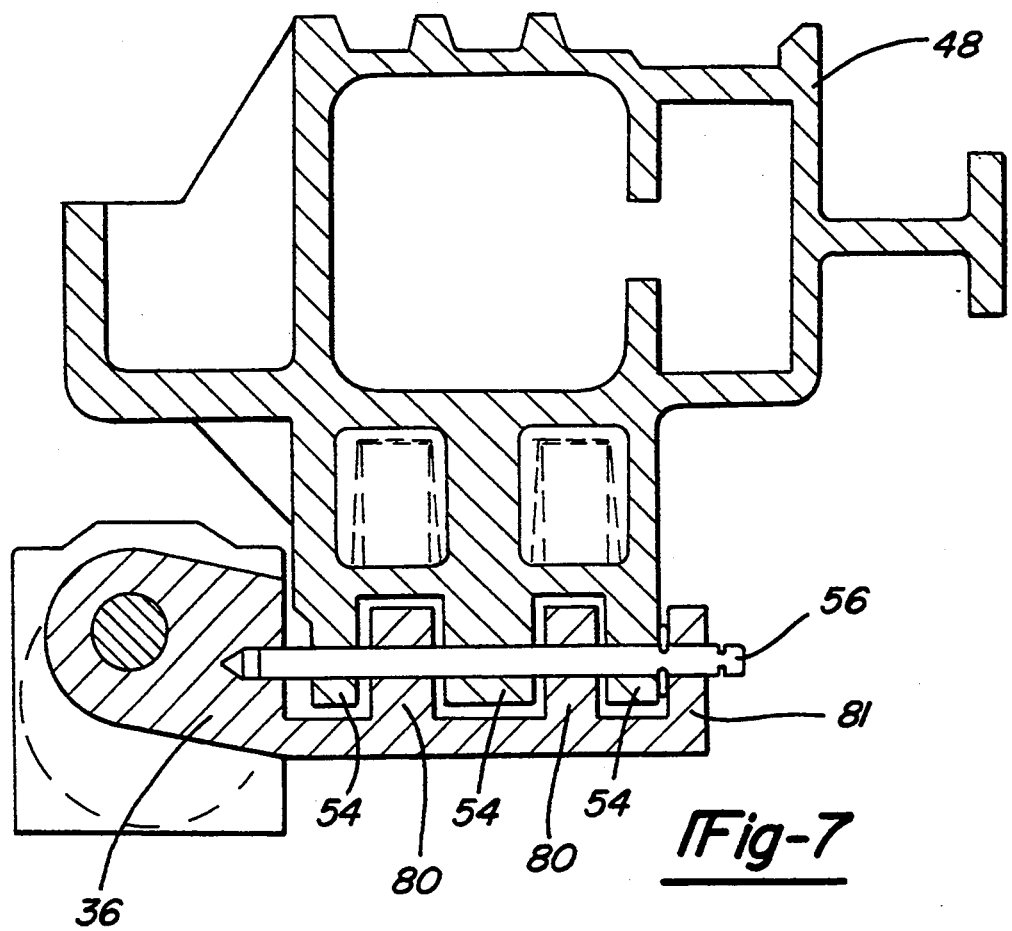
FIG. 7 is a cross-sectional view along line 7—7 as shown in FIG. 6.

FIG. 7 is a cross sectional view showing the mount for drive 36. As shown, channel inserts 80, and side wall 81 provide a secure mount for drive 36 on channel walls 54.

Figure 8:
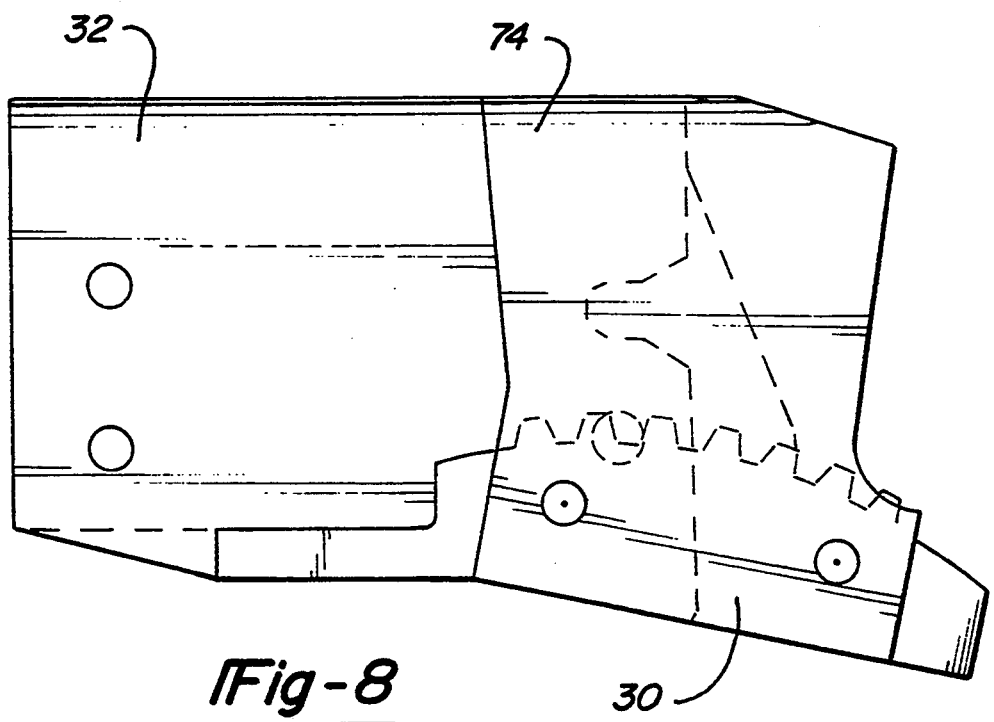
FIG. 8 is a view of a portion of the inventive mechanism.

FIG. 8 is a side view of rack 30 and rack mount 32. As shown, casing 74 is positioned outwardly of rack 30, and will encircle the worm gear.

FIG. 9 is a top view of drive 34 for worm gear 38, and rack mount 32. As shown, channel inserts 80, and side wall 81 all receive pin 56 such that drive 34 may pivot relative to the steering column. As shown, casing 74 underlies rack 30, and rack mount 32 is offset from rack 30. The adjusting screw 90 is adjusted to remove end play after assembly of drive 34 to steering column 48.

The particular control features utilized with this invention may all be well known elements in the art. Further, the details of the mechanical operation of this system are disclosed more fully in the parent applications.

A preferred embodiment of the present invention has been disclosed, however, a worker of ordinary skill in the art would recognize that certain modifications would come within the scope of this invention. For that reason, the following claims should be studied in order to determine the true scope and content of this invention.

We claim:

1. A vehicle steering system comprising:
   a fixed steering column;
   a wheel column pivotally connected to said fixed steering column, said wheel column being selectively positioned at one of a plurality of pivoted positions relative to said fixed steering column;
   control means for pre-selecting one of said plurality of pivoted positions and setting said preselected position in a memory, means to select one of said plurality of pivoted positions stored in such memory and an automatic means to position of said wheel column at said one position; and means sensing a resistance force to further movement as said automatic means moves said wheel column towards said one position, said automatic means ceasing further movement should said force be greater than a predetermined maximum, said automatic means stalls, and does not further move said wheel column upon said resistance force exceeding said predetermined maximum, and a sensor associated with said automatic means senses the stall and stops a motor for said automatic means, after said stall has occurred for a predetermined period of time, said predetermined period of time being greater than one second.

2. A vehicle steering system as recited in claim 1, wherein a steering wheel is rotatably received in both said wheel column and said steering column and said control means comprises a control switch.

3. A vehicle steering system as recited in claim 1, wherein said automatic means pivots said wheel column from a vertically uppermost first position relative to a vehicle operator to said one position upon activation, and said automatic means pivots said wheel column from said one position to said first position upon de-activation of said automatic means.

4. A vehicle steering system as recited in claim 3, wherein said activation occurs by inserting a key into the ignition of a vehicle, and de-activation occurs by removing the key from the ignition.

5. A vehicle steering system as recited in claim 1, wherein said period of time is 1.5 seconds.

6. A vehicle steering system comprising:
a fixed steering column;
a wheel column pivotally connected to said fixed steering column, said wheel column being selectively positioned at any one of a plurality of pivoted positions relative to said fixed steering column;
a control means for selecting one of said plurality of pivoted positions, and allowing change of said selected one position, and an automatic means to drive said wheel column to said one position; and
said wheel column being positioned at a first position spaced vertically upwardly from an operator when said control means is in a deactivated state, said means moving said wheel column towards said one position upon actuation, and sensor means sensing a resistance force to further movement as said automatic means moves said wheel column towards said one position, said sensor means sensing the stall and said automatic means ceasing further movement should said sensor sense a stall for a preselected period of time, said predetermined period of time being greater than one second, and stopping said automatic means.

7. A vehicle steering system as recited in claim 6, wherein said automatic means stalls should said resistance force exceed said predetermined maximum, a sensor on a motor for said automatic means sensing said stall and stopping said motor should said stall be detected for a predetermined period of time.

8. A vehicle steering system as recited in claim 6, wherein said predetermined period of time is 1.5 seconds.

* * * * *